United States Patent
Chang et al.

(10) Patent No.: US 10,165,460 B2
(45) Date of Patent: Dec. 25, 2018

(54) MOBILE COMMUNICATION METHOD, USER TERMINAL, AND PROCESSOR

(75) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/348,591

(22) PCT Filed: Aug. 20, 2012

(86) PCT No.: PCT/JP2012/070994
§ 371 (c)(1),
(2), (4) Date: Mar. 28, 2014

(87) PCT Pub. No.: WO2013/047002
PCT Pub. Date: Apr. 4, 2013

(65) Prior Publication Data
US 2014/0228017 A1    Aug. 14, 2014

Related U.S. Application Data

(60) Provisional application No. 61/541,718, filed on Sep. 30, 2011.

(51) Int. Cl.
*H04W 24/10* (2009.01)
*H04W 24/08* (2009.01)
*H04W 24/02* (2009.01)

(52) U.S. Cl.
CPC .......... *H04W 24/10* (2013.01); *H04W 24/02* (2013.01); *H04W 24/08* (2013.01)

(58) Field of Classification Search
CPC . H04W 28/00; H04W 28/0268; H04W 88/02; H04W 16/22
(Continued)

(56) References Cited

U.S. PATENT DOCUMENTS 8,731,543 B2 *   5/2014   Jung .................... H04W 24/10
                                                  455/422.1
8,868,063 B2 *  10/2014   Wang ................... H04W 24/10
                                                  455/405
(Continued)

FOREIGN PATENT DOCUMENTS

EP       2360958 A1    8/2011
JP    2011-061633 A    3/2011
(Continued)

OTHER PUBLICATIONS

3GPP TS 37.320 v10.1.0 (Mar. 2011) 3rd Generation Partnership Project; Technical Specification Group Radio Access Network: Universal Terrestrial Radio Access (UTRA) and Evolved Universal Terrestrial Radio Access (E-UTRAN); Radio measurement collection for Minimization of Drive Tests (MDT); Overall description; Stage 2 (Release 10).*
(Continued)

*Primary Examiner* — Vladimir Magloire
*Assistant Examiner* — Donald H Braswell
(74) *Attorney, Agent, or Firm* — Studebaker & Brackett PC

(57) ABSTRACT

A mobile communication method in a mobile communication system supporting the Minimization of Drive Tests (MDT) comprises a step in which an Immediate MDT scheme is used to perform the MDT to measure Quality of Service (QoS) parameters in the communication between a user terminal and a network that communicates with the user terminal.

3 Claims, 12 Drawing Sheets

(58) Field of Classification Search
USPC .......................................... 455/423, 424, 425
See application file for complete search history.

(56) References Cited

U.S. PATENT DOCUMENTS

| | | | |
|---|---|---|---|
| 2004/0176040 A1 | 9/2004 | Thornton et al. | |
| 2004/0198294 A1* | 10/2004 | Hagin-Metzer | H04L 1/0027 455/296 |
| 2005/0159166 A1* | 7/2005 | Jonsson | H04W 28/24 455/452.2 |
| 2005/0163047 A1* | 7/2005 | McGregor | H04W 24/00 370/229 |
| 2007/0037570 A1 | 2/2007 | Donovan et al. | |
| 2009/0137210 A1 | 5/2009 | Yanagisako | |
| 2011/0045819 A1* | 2/2011 | Lee | H04W 24/10 455/423 |
| 2011/0065466 A1 | 3/2011 | Sakoda et al. | |
| 2011/0201364 A1 | 8/2011 | Capuozzo et al. | |
| 2012/0155298 A1* | 6/2012 | Yang | H04W 24/08 370/252 |
| 2012/0230217 A1* | 9/2012 | Sawai | H04L 5/001 370/252 |
| 2012/0309404 A1* | 12/2012 | Suzuki | H04W 24/10 455/450 |
| 2016/0302095 A1* | 10/2016 | Futaki | H04W 24/08 |

FOREIGN PATENT DOCUMENTS

| | | |
|---|---|---|
| WO | 2007/119314 A1 | 10/2007 |
| WO | 2010/104171 A1 | 9/2010 |
| WO | 2011/083800 A1 | 7/2011 |

OTHER PUBLICATIONS

3GPP TSG RAN Meeting #53, RP 111361, Enhancement of Minimization of Drive Tests (MDT) for E-UTRAN and UTRAN—Core Part (Sep. 16, 2011).*

3GPP TS 23.107, v10.1.0 (Jun. 2011); 3rd Generation Partnership Project; Technical Specification Group Services and Sytem Aspects: Quality o fService (QoS) concept and architecture. (Release 10).*

3GPP TR 36.805 v9.0.0 (Dec. 2009) 3rd Generation Partnership Project; Technical Specification Group Radio Access Network; Study on Minimization of Drive Tests in Next Generation Networks; (Release 9).*

International Search Report; PCT/JP2012/070994; dated Sep. 11, 2012.

3GPP TS 32.425 V10.5.0 (Jun. 2011); 3rd Generation Partnership Project; Technical Specification Group Services and System Aspects; Telecommunication management; Performance Management (PM); Performance measurements Evolved Universal Terrestrial Radio Access Network (E-UTRAN) (Release 10); pp. 1-8.

3GPP TS 37.320 V10.1.0 (Mar. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overal description; Stage 2 (Release 10); pp. 1-17.

3GPP TSG RAN Meeting #53; Nokia Siemens Networks, Nokia Corporation, Mediatek; "Enhancement of Minimization of Drive Tests for E-UTRAN and UTRA—Core Part"; Fukuoka, Japan, Sep. 13-16, 2011; RP-111361; pp. 1-6.

The extended European search report issued by the European Patent Office dated Jul. 7, 2015, which corresponds to European Patent Application No. 12836980.8-1854 and is related to U.S. Appl. No. 14/348,591.

Communication pursuant to Rules 70(2) and 70a(2) EPC issued by the European Patent Office dated Jul. 24, 2015, which corresponds to European Patent Application No. 12836980.8-1854 and is related to U.S. Appl. No. 14/348,591.

Nokia Siemens Networks et al.; "Addition of RF measurements for MDT"; 3GPP; TSG-RAN WG2 Meeting #72bis; R2-110469; 37.320 CR CRNum; Jan. 17-21, 2011; pp. 1-2; vol. 10.0.0; Dublin, Ireland.

Office Action issued by the Japanese Patent Office dated Jan. 31, 2017, which corresponds to Japanese Patent Application No. 2016-018784 and is related to U.S. Appl. No. 14/348,591 with concise statement of relevance; 3pp.

* cited by examiner

| QCI | GUARANTEE | PRIORITY | DELAY BUDGET | LOSS RATE | APPLICATION |
|---|---|---|---|---|---|
| 1 | GBR | 2 | 100ms | 1e-2 | VoIP |
| 2 | GBR | 4 | 150ms | 1e-3 | VIDEO CALL |
| 3 | GBR | 5 | 300ms | 1e-6 | STREAMING |
| 4 | GBR | 3 | 50ms | 1e-3 | REAL-TIME GAME |
| 5 | Non-GBR | 1 | 100ms | 1e-6 | IMS SIGNALING |
| 6 | Non-GBR | 7 | 100ms | 1e-3 | INTERACTIVE GAME |
| 7 | Non-GBR | 6 | 300ms | 1e-6 | TCP PROTOCOL (BROWSING, E-MAIL, AND FOUL DOWNLOAD) |
| 8 | Non-GBR | 8 | 300ms | 1e-6 | |
| 9 | Non-GBR | 9 | 300ms | 1e-6 | |

MOBILE COMMUNICATION METHOD, USER TERMINAL, AND PROCESSOR

TECHNICAL FIELD

The present invention relates to a mobile communication method, a user terminal, and a processor in a mobile communication system based on 3GPP standards.

BACKGROUND ART

In a mobile communication system, a radio communication environment of a radio base station is changed due to construction of a building near the base station, change of an installation state of a neighboring base station of the base station or the like. For this reason, operators have conventionally performed drive tests in which reception states of signals from the base station (hereinafter, referred to as "radio states") are measured to collect the measurement data by using a measurement vehicle with measurement equipment mounted thereon.

Such measurement and collection can contribute to optimization of coverage of the base station, for example, but have problems of requiring many man-hours and high cost. Hence, the 3GPP (3rd Generation partnership project) which is a standardization project for mobile communication systems has been developing specifications of MDT (Minimization of Drive Tests) for automatically performing the measurement and the collection by using user terminals carried by users (see Non-patent document 1).

One of MDT methods is logged-type MDT (hereinafter, appropriately referred to as "Logged MDT"). According to the current specifications for Logged MDT, the user terminal in an idle state measures a radio state according to measurement configuration information set by a network, logs a measurement result together with location information and time information as measurement data, and reports the logged measurement data to the network later.

In addition, another MDT method is immediate-report-type MDT (referred to as "Immediate MDT"). According to the current specifications for Immediate MDT, the user terminal in a connected state measures a radio state according to measurement configuration information set by a network, sends the network a report as measurement data including a measurement result and location information.

As described above, according to the current MDT specifications, the user terminal performs measurement of the radio state, that is, measurement on a lower layer (a physical layer). The network collects the measurement data acquired by such measurement, and thereby identifies a dead zone (a coverage hole) thus to achieve coverage optimization such as solving a problem of the coverage hole.

PRIOR ART DOCUMENT

Non-Patent Document

Non-patent document 1: 3GPP TS 37.320 v10.1.0

SUMMARY OF INVENTION

However, the current MDT specifications are not necessarily suitable for communication capacity optimization, although being able to contribute to the coverage optimization of the mobile communication system. For example, it is difficult to identify a zone having a low capacity (a low capacity zone) despite in a favorable radio state.

Hence, the present invention provides a mobile communication method, a user terminal, and a processor which are capable of contributing to capacity optimization of a mobile communication system.

A mobile communication method according to the present invention is a method used in a mobile communication system supporting MDT (Minimization of Drive Tests), and comprises: a step of performing the MDT that measures a QoS (Quality of Service) parameter in communication between a user terminal and a network that communicates with the user terminal, by an Immediate MDT scheme.

The step may comprise a report step of transmitting a report including location information of the user terminal, from the user terminal to the network.

The reporting step may comprise a step of periodically transmitting the report to the network.

The QoS parameter may be a parameter measured at a layer higher than a physical layer.

The step may comprise a measurement step of measuring the QoS parameter for each QCI (QoS Class Identifier).

A user terminal according to the present invention supports MDT (Minimization of Drive Tests) and comprises: a controller that performs the MDT that measures a QoS (Quality of Service) parameter in communication between the user terminal and a network that communicates with the user terminal, by an Immediate MDT scheme.

A processor according to the present invention is installed in a user terminal supporting MDT (Minimization of Drive Tests), performs: the MDT that measures a QoS (Quality of Service) parameter in communication between the user terminal and a network that communicates with the user terminal, by an Immediate MDT scheme.

BRIEF DESCRIPTION OF DRAWINGS

FIG. 4 is a chart showing a QCI table according to the embodiment of the present invention.

DESCRIPTION OF EMBODIMENTS

A description is given of an embodiment of the present invention with reference to the drawings. In the following description of the drawings according to the embodiment, same or similar reference signs denote same or similar elements and portions.

(Configuration of Mobile Communication System)

Figure 1:
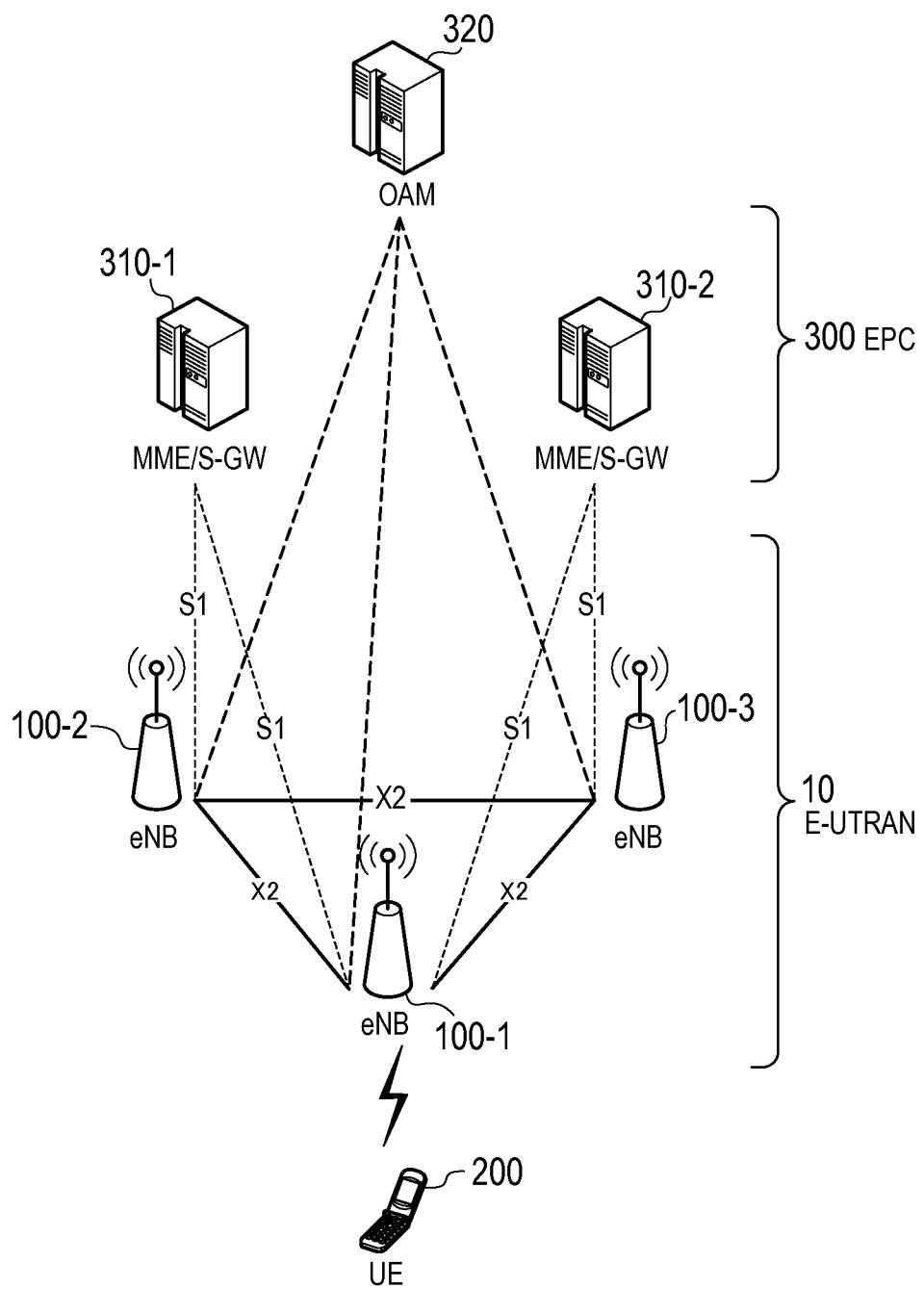
FIG. 1 is an overall configuration diagram of a mobile communication system according to an embodiment of the present invention.

FIG. 1 is an overall configuration diagram of a mobile communication system 1 according to this embodiment. The mobile communication system 1 according to this embodiment has a configuration based on LTE (Long Term Evolution) or LTE-Advanced whose specifications are developed by the 3GPP and supports the aforementioned Immediate MDT.

As shown in FIG. 1, the mobile communication system 1 includes eNBs (evolved Node-Bs) 100; a UE (User Equipment) 200; MMEs (mobility management Entities)/S-GWs (Serving Gateways) 310; and an OAM (Operation and maintenance) 320. In this embodiment, each of the eNBs 100 corresponds to a base station, and the UE 200 corresponds to a user terminal.

The multiple eNBs 100 form an E-UTRAN (Evolved-UMTS Terrestrial Radio Access Network) 10 which is an LTE radio access network. The multiple MMEs/S-GWs 310 form an EPC (Evolved Packet Core) 300 which is an LTE core network. In this embodiment, the E-UTRAN 10 and the EPC 300 form a network. In addition, the OAM 320 may be included in the network.

Each eNB 100 is a fixed radio communication apparatus installed by an operator and is configured to communicate with the UE 200. The eNB 100 communicates with neighboring ones of the other eNBs 100 on an X2 interface and communicates with any of the MMEs/S-GWs 310 on an S1 interface.

Each of the eNBs 100 forms one or more cells which are minimum units of a radio communication area. The eNB 100 always broadcasts a reference signal from which the cell can be identified. In the mobile communication system 1, one or more cells form one tracking area (TA). The TA is a unit of an area in which location registration and paging are performed.

The UE 200 is a portable type radio communication device carried by the user. The UE 200 accesses the cell formed by the eNB 100 and is accommodated in the cell. The cell accommodating the UE 200 is referred to as a serving cell.

The UE 200 executes one or multiple applications and performs communication by using the one or multiple applications. A state in which the UE 200 is executing communication with a communication destination is referred to as a connected sate, while a state in which the UE 200 is in standby is referred to as an idle state.

The UE 200 performs serving-cell switching to a cell in the best communication state. The serving-cell switching performed in the connected state is referred to as a handover. The handover is controlled by the serving cell (eNB 100).

The UE 200 measures a state of radio (hereinafter, simply referred to as a "radio state") from the serving cell and neighboring cells under control of the serving cell, and transmits a report on the measurement result. Such reporting is referred to as measurement reporting. Here, the radio state means a reference signal reception power (RSRP) or a reference signal reception quality (RSRQ), for example.

Each MME manages a TE and/or a cell on which the UE 200 camps and is configured to perform various mobility management of the UE 200. Each S-GW is configured to control transfer of user data transmitted and to be received by the UE 200. The OAM 320 is a server apparatus installed by the operator and is configured to maintain and monitor the E-UTRAN 10.

The eNB 100 transmits Configuration information for Immediate MDT to the UE 200 (in the connected state) under the control of the eNB 100 itself, as necessary. The Immediate MDT is an extended function of the aforementioned measurement reporting, and can include the location information of the UE 200 in the report. The location information is GPS location information when the UE 200 has a GPS function, and is RF fingerprint information when the UE 200 does not have the GPS function.

The eNB 100 having received the measurement data (the radio state information and the location information) from the UE 200 in which Immediate MDT is set transfers the received measurement data to the OAM 320. When finding a coverage problem on the basis of the measurement data acquired in such a manner, the OAM 320 notifies the operator of the found coverage problem or optimizes the network to solve the coverage problem.

In this embodiment, in Immediate MDT, the UE 200 measures not only the radio state but also QoS (Quality of ServiceQuality) parameters used in the communication with the network. The QoS parameters are, for example, a packet transmission delay, a packet loss rate, a transmission delay fluctuation (a jitter), and the like, and are parameters measurable on an application level. Here, it is preferable that the UE 200 measure the QoS parameters for each kind of communication with the network. The communication kinds are, for example, an application (a service), a bearer, and the like, but an example of measuring the QoS parameters for each application will be described below.

Then, the UE 200 transmits a report including information on the measured QoS parameters to the network. Thereby, the network can achieve the capacity optimization on the basis of the information on the QoS parameters. For example, it is possible to identify the zone having a low capacity (the low capacity zone) despite in a favorable radio state.

Figure 2:
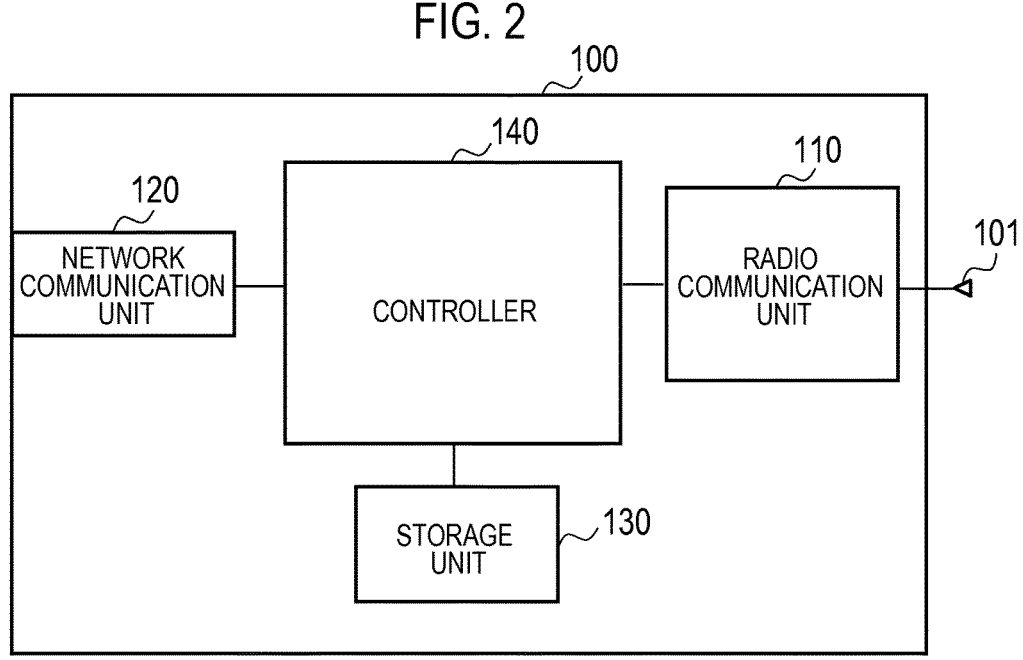
FIG. 2 is a block diagram of an eNB (a base station) according to the embodiment of the present invention.

Next, a description is given of each eNB 100. FIG. 2 is a block diagram of the eNB 100.

As shown in FIG. 2, the eNB 100 includes an antenna 101, a radio communication unit 110, a network communication unit 120, a storage unit 130, and a controller 140.

The antenna 101 is used to transmit and receive a radio signal. The radio communication unit 110 is formed by using, for example, a radio frequency (RF) circuit, a base band (BB) circuit, and the like, and transmits and receives the radio signal through the antenna 101. The network communication unit 120 communicates with other network entities (the MMEs/S-GWs 310, the OAM 320, the neighboring eNBs 100, and the like). The storage unit 130 is formed by using a memory, for example, and stores various information used for eNB 100 control and the like. The controller 140 is formed by using a processor, for example, and controls various functions of the eNB 100.

The controller 140 has a scheduler function allocating time and frequency resources to the UE 200. The controller 140 also has a function of controlling a handover of the UE 200 based on the measurement report from the UE 200. The controller 140 further has functions of generating measurement configuration information for the MDT and transmitting the measurement configuration information to the UE 200.

Figure 3:
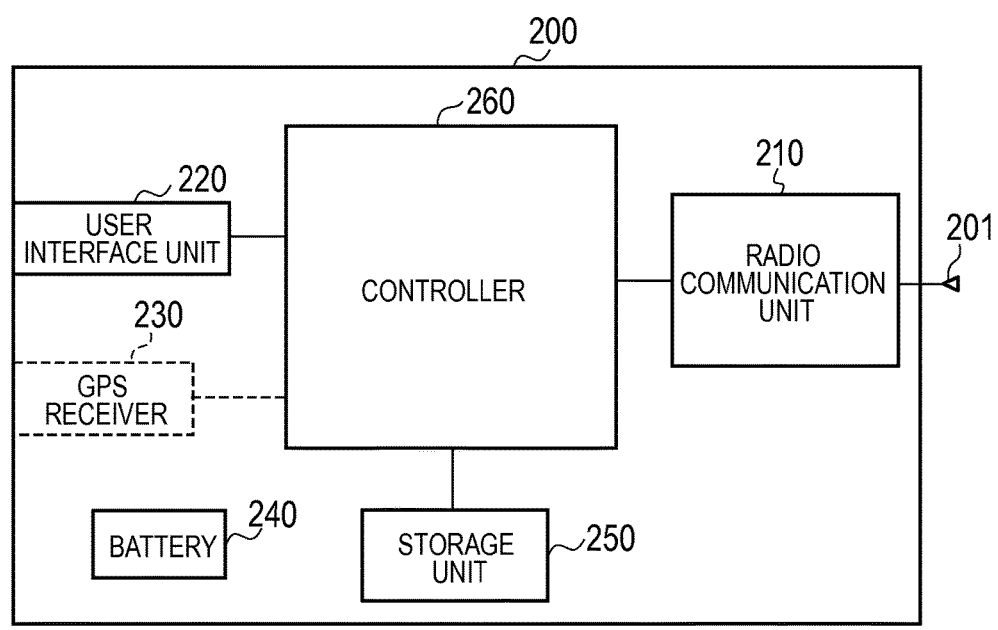
FIG. 3 is a block diagram of a UE (a user terminal) according to the embodiment of the present invention.

Next, a description is given of a configuration of the UE 200. FIG. 3 is a block diagram of the UE 200.

As shown in FIG. 3, the UE 200 includes an antenna 201, a radio communication unit 210, a user interface unit 220, a GPS receiver 230, a battery 240, a storage unit 250, and a controller 260. However, the UE 200 does not have to include the GPS receiver 230. In addition, when being a card-type terminal or the like, the UE 200 does not have to include the user interface unit 220 and the battery 240.

The antenna 201 is used to transmit and receive a radio signal. The radio communication unit 210 is formed by using, for example, a RF circuit, a BB circuit, and the like, and transmits and receives the radio signal through the antenna 201. The user interface unit 220 includes a display, a button, and the like each of which serves as an interface with the user. The battery 240 is a chargeable battery and stores power to be supplied to the blocks of the UE 200. The storage unit 250 is formed by using a memory, for example, and stores various information used for UE 200 control and the like. The controller 260 is formed by using a processor, for example, and controls various functions of the UE 200.

In this embodiment, the controller 260 executes the one or multiple applications and performs communication in the connected state by using the one or multiple applications. Priority control (that is, QoS control) according to the application type is applied to the communication between the UE 200 and the network (eNB 100). The QoS control is performed for each of the UE 200 and the network (eNB 100). In LTE, QCIs (QoS Class Identifiers) for defining classes in the QoS control are provided. The storage unit 250 stores therein information on the QCI (a QCI table) in advance.

FIG. 4 shows an example of the QCI table. As shown in FIG. 4, nine classes of the QCIs are defined. The QoS control is performed in each bearer according to a corresponding one of the QCIs. Specifically, the minimum bit rate is guaranteed in QCIs 1 to 4 associated with GBR (Guaranteed Bit Rate), and is not guaranteed in QCIs 5 to 9 associated with Non-GBR. In addition, each QCI is associated with a threshold required for a corresponding one of the QoS parameters (hereinafter, referred to as a "QCI-required threshold"). The example of FIG. 4 shows the QCI-required thresholds for a delay allowable time (a delay budget) and a packet loss rate. The scheduler function of the eNB 100 performs the priority control (QoS control) according to the priority represented by the QCI associated with an application currently executed by the UE 200.

In this embodiment, the controller 260 performs various controls for MDT by using the QCI table as shown in FIG. 4. Hereinbelow, a description is given of an MDT-related operation of the mobile communication system 1, focusing on functions of the controller 260.

(Operation of Mobile Communication System)

The description of the MDT-related operation of the mobile communication system 1 is given in the order of (1) a periodic report type and (2) an event trigger type.

In a method of the periodic report type, the UE 200 periodically transmits a measurement report to the network. The UE 200 periodically measures the radio state and the QoS parameters and periodically transmits the measurement report.

In a method of the event trigger type, a report is transmitted at a predetermined trigger. The method of the event trigger type also includes a method in which a measurement result is logged at predetermined timing.

Note that the UE 200 is in the connected state at the start of each of the following operation patterns.

(1) Periodic Report Type

Hereinbelow, descriptions are given of Operation Patterns 1 to 5 of the periodic report type.

(1.1) Operation Pattern 1 of Periodic Report Type

Figure 5:
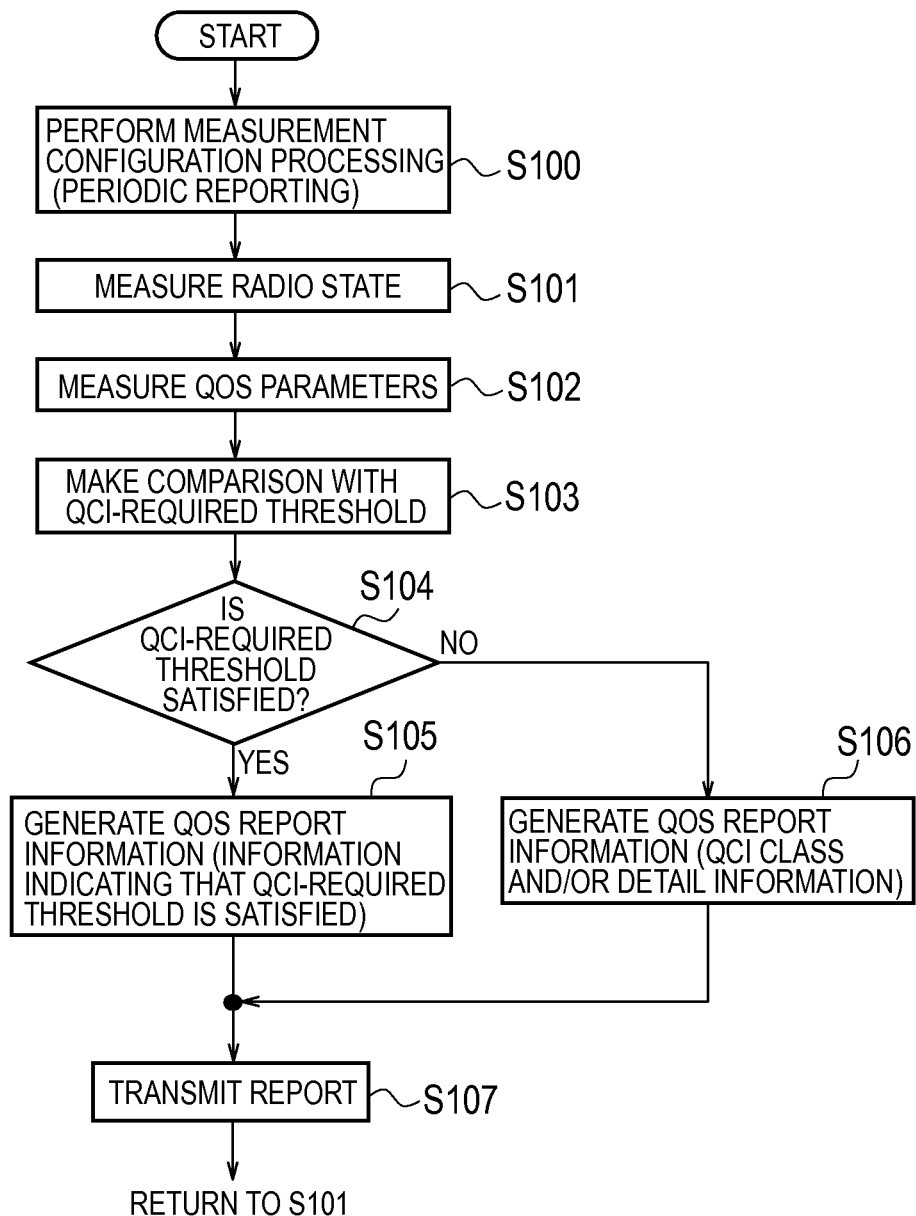
FIG. 5 is an operation flowchart of Operation Pattern 1 of a periodic report type according to the embodiment of the present invention.

FIG. 5 is an operation flowchart of Operation Pattern 1 of the periodic report type.

As shown in FIG. 5, measurement configuration processing is performed in Step S100.

Specifically, after generating measurement configuration information for the UE 200, the controller 140 of the eNB 100 controls the radio communication unit 110 so that the radio communication unit 110 can transmit the measurement configuration information to the UE 200. The measurement configuration information includes information instructing periodic reporting of radio state information. Alternatively, the measurement configuration information may include information instructing periodic reporting related to QoS. In this case, the information may include information specifying an application or a bearer to be measured or the QCI class (any of 1 to 9).

The radio communication unit 210 of the UE 200 receives the measurement configuration information. The controller 260 of the UE 200 stores the measurement configuration information received by the radio communication unit 210, in the storage unit 250. The controller 260 starts measurement processing according to the measurement configuration information. In this operation pattern, even though the periodic reporting related to QoS is not instructed, the QoS parameters are measured.

Next, in Step S101, the controller 260 measures the radio state based on a radio signal received by the radio communication unit 210. The controller 260 stores radio state information acquired by measuring the radio state of each of the serving cell and neighboring cells, in the storage unit 250. Thereafter, the processing proceeds to Step S102.

In Step S102, the controller 260 measures the QoS parameters for the currently executed application. The packet transmission delay and the packet loss rate are herein measured as the QoS parameters. The controller 260 stores the measured QoS parameters in the storage unit 250. Thereafter, the processing proceeds to Step S103. Note that the processing in Step S102 may be performed between Step S100 and Step S101.

In Step S103, the controller 260 compares each of the measured QoS parameters with the corresponding QCI-required threshold associated with the currently executed application, by using the QCI table stored in the storage unit 250. Thereafter, the processing proceeds to Step S104.

In Step S104, the controller 260 checks whether or not the measured QoS parameter satisfies the QCI-required threshold associated with the currently executed application. If the QoS parameter satisfies the QCI-required threshold (Step S104; YES), the processing proceeds to Step S105. If the QoS parameter does not satisfy the QCI-required threshold (Step S104; NO), the processing proceeds to Step S106.

In Step S105, the controller 260 generates QoS report information indicating that the QCI-required threshold is satisfied and stores the QoS report information in the storage unit 250. Thereafter, the processing proceeds to Step S107.

On the other hand, in Step S106, the controller 260 generates QoS report information indicating that the QCI-required threshold is not satisfied and stores the QoS report information in the storage unit 250. For example, the controller 260 generates, as the QoS report information, information indicating the QCI class (any one of 1 to 9) which does not satisfy the QCI-required threshold and/or information indicating any of the QoS parameters (the packet transmission delay and the packet loss rate) which does not satisfy the QCI-required threshold, and stores the QoS report information in the storage unit 250. Thereafter, the processing proceeds to Step S107.

In Step S107, the controller 260 controls the radio communication unit 210 so that a report can be transmitted to the eNB 100, the report including the radio state information measured and stored in the storage unit 250 in Step S101 and the QoS report information generated and stored in the storage unit 250 in Step S105 or S106. Thereafter, the processing returns to Step S101.

Note that the example in which the QoS parameters are measured for the one application (service) in this operation pattern has been described for convenience of the explanation, but the QoS parameters may be measured for multiple applications. In this case, the QoS report information may be generated for each application and the multiple pieces of the QoS report information may be transmitted while being included in a single report. Alternatively, any piece of QoS report information which does not satisfy the QCI-required threshold may be transmitted while being included in the single report. The same holds for the following Operation Patterns 2 to 5 of the periodic report type.

In addition, the report transmitted to the eNB 100 includes location information of the UE 200 acquired immediately before the transmission. The same holds for the following Operation Patterns 2 to 5 of the periodic report type.

(1.2) Operation Pattern 2 of Periodic Report Type

Figure 6:
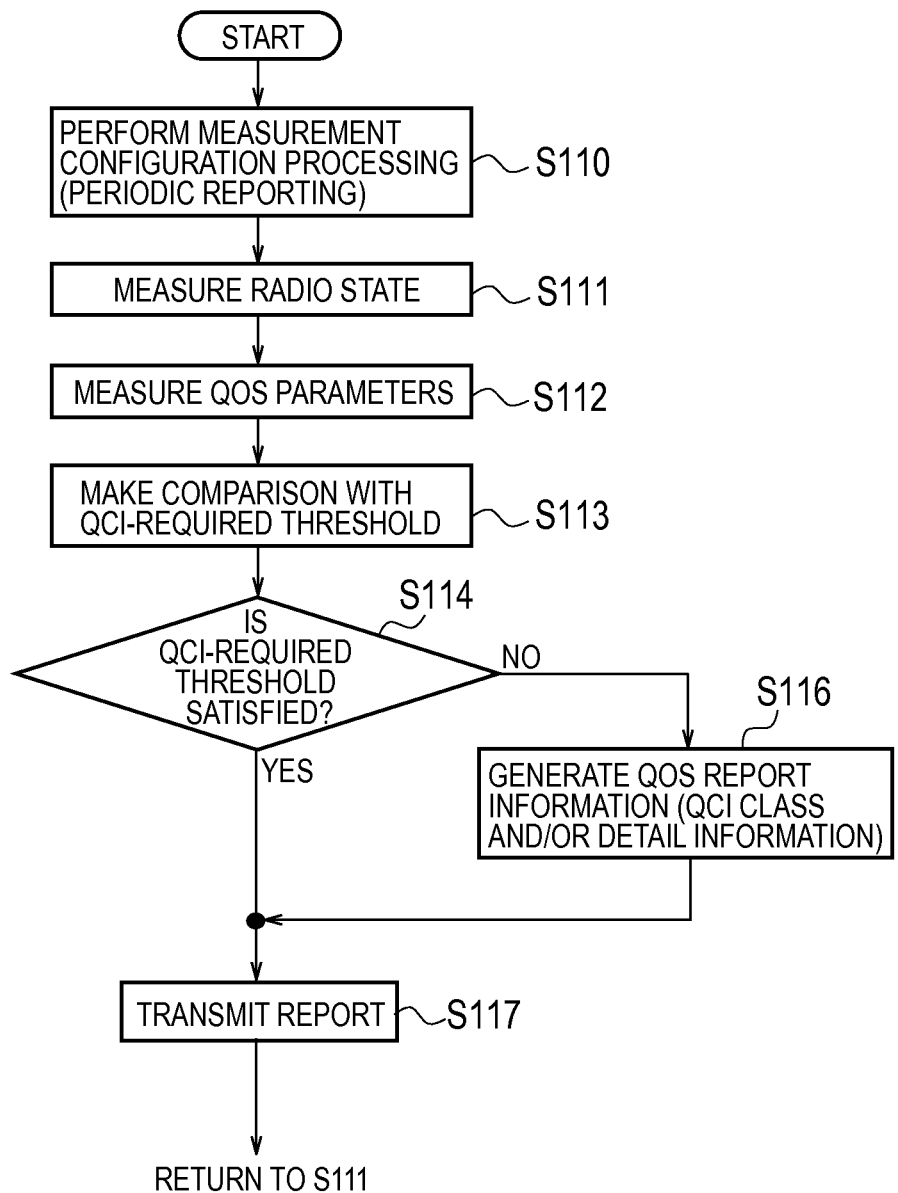
FIG. 6 is an operation flowchart of Operation Pattern 2 of the periodic report type according to the embodiment of the present invention.

FIG. 6 is an operation flowchart of Operation Pattern 2 of the periodic report type. Since processing in Steps S110 to S113 is the same as that in Operation Pattern 1 of the periodic report type, processing in and after Step S114 will be described.

As shown in FIG. 6, in Step S114, the controller 260 checks whether or not the measured QoS parameter satisfies the QCI-required threshold associated with the currently executed application. If the QoS parameter satisfies the QCI-required threshold (Step S114; YES), the processing proceeds to Step S117. If the QoS parameter does not satisfy the QCI-required threshold (Step S114; NO), the processing proceeds to Step S116.

In Step S116, the controller 260 generates QoS report information indicating that the QCI-required threshold is not satisfied and stores the QoS report information in the storage unit 250. For example, the controller 260 generates, as the QoS report information, information indicating the QCI class (any one of 1 to 9) which does not satisfy the QCI-required threshold and/or information indicating any of the QoS parameters (the packet transmission delay and the packet loss rate) which does not satisfy the QCI-required threshold, and stores the QoS report information in the storage unit 250. Thereafter, the processing proceeds to Step S117.

In Step S117, the controller 260 controls the radio communication unit 210 so that a report including the radio state information measured and stored in the storage unit 250 in Step S111 can be transmitted to the eNB 100. Here, if the QoS report information is generated in Step S116, the controller 260 controls the radio communication unit 210 so that the QoS report information can also be transmitted while being included in the report. Thereafter, the processing returns to Step S111.

As described above, if the QCI-required threshold is satisfied, the satisfaction is not reported in this operation pattern. Thus, an amount of information (that is, overhead) to be included in the report can be reduced in comparison with Operation Pattern 1.

(1.3) Operation Pattern 3 of Periodic Report Type

Figure 7:
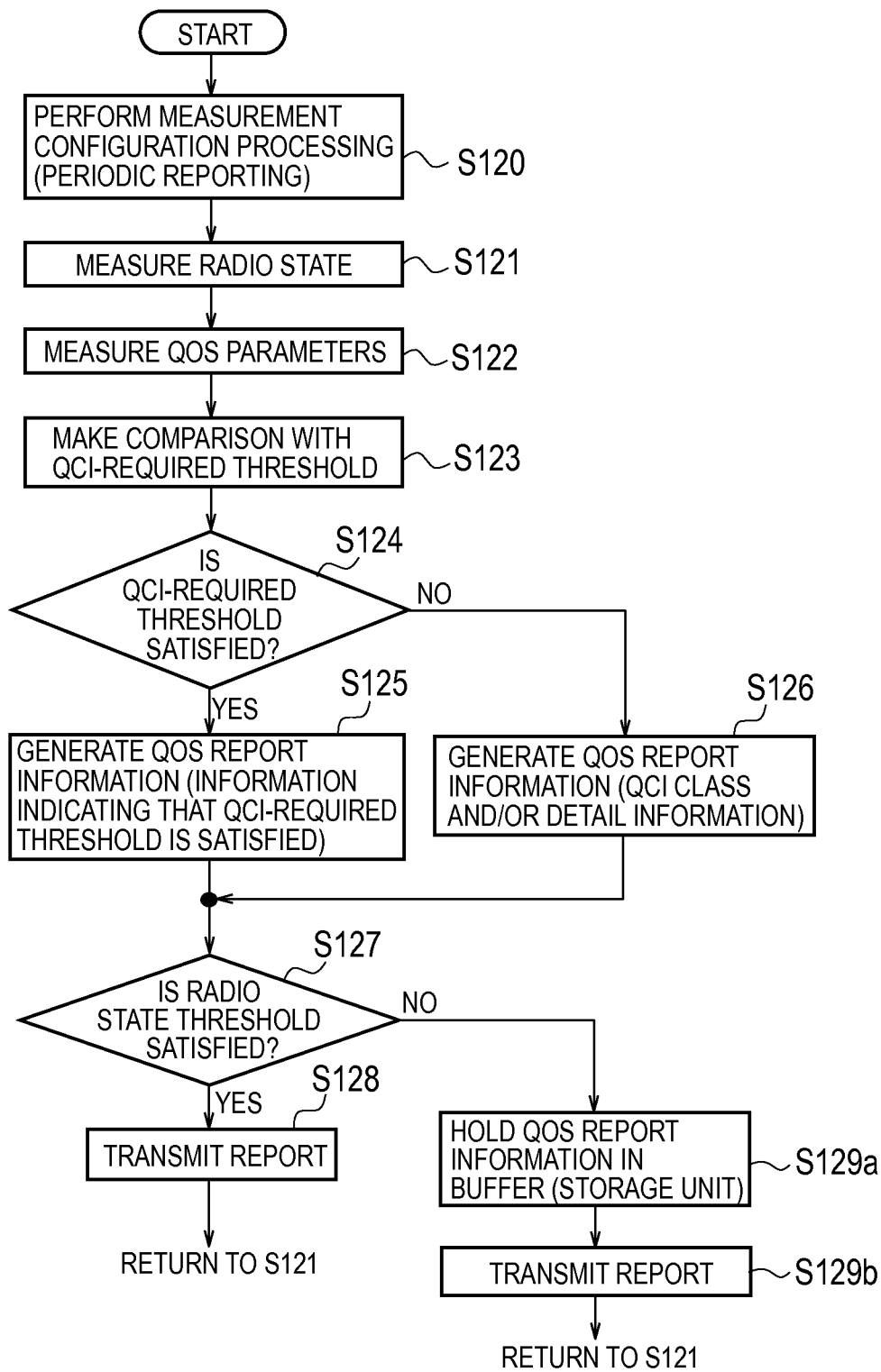
FIG. 7 is an operation flowchart of Operation Pattern 3 of the periodic report type according to the embodiment of the present invention.

FIG. 7 is an operation flowchart of Operation Pattern 3 of the periodic report type. Since processing in Steps S120 to S126 is the same as that in Operation Pattern 1 of the periodic report type, processing in and after Step S127 will be described.

As shown in FIG. 7, in Step S127, the controller 260 checks whether or not the radio state measured in Step S121 satisfies a radio state threshold on the basis of the radio state information stored in the storage unit 250. The radio state threshold is in advance stored in the storage unit 250, for example. If the radio state satisfies the radio state threshold (Step S127; YES), the processing proceeds to Step S128. If the radio state does not satisfy the radio state threshold (Step S127; NO), the processing proceeds to Step S129a.

In Step S128, the controller 260 controls the radio communication unit 210 so that a report can be transmitted to the eNB 100, the report including the radio state information measured and stored in the storage unit 250 in Step S121 and the QoS report information generated and stored in the storage unit 250 in Step S125 or S126. Thereafter, the processing returns to Step S121.

On the other hand, in Step S129a, the controller 260 holds the QoS report information stored in the storage unit 250. In Step S129b, the controller 260 controls the radio communication unit 210 while holding the QoS report information so that a report including the radio state information stored in the storage unit 250 can be transmitted to the eNB 100. Thereafter, the processing returns to Step S121. Note that if the radio state recovers later, the QoS report information stored in the storage unit 250 is also transmitted in Step S128 iterated after the processing returns to Step S121, together with a report to be transmitted in Step S128.

As described above, since the overhead is preferably reduced in a state where the radio state is deteriorated, the QoS report information is held without being reported. Then, after the radio state recovers, the QoS report information can be transmitted while being included in the report.

Here, like Operation Pattern 2, Step S125 may be omitted. Specifically, if the QCI-required threshold is satisfied, the QoS report information is not reported.

(1.4) Operation Pattern 4 of Periodic Report Type

Figure 8:
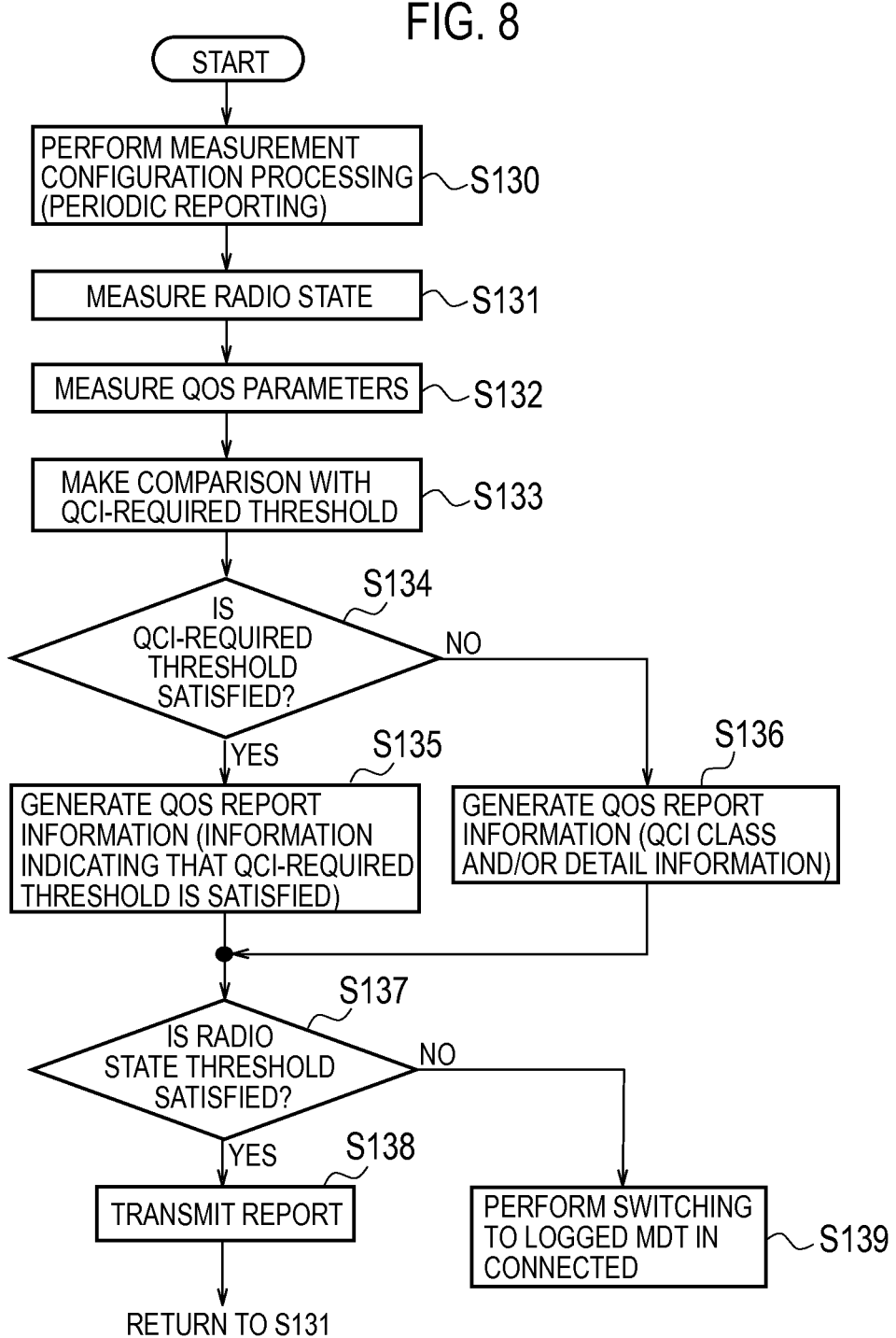
FIG. 8 is an operation flowchart of Operation Pattern 4 of the periodic report type according to the embodiment of the present invention.

FIG. 8 is an operation flowchart of Operation Pattern 4 of the periodic report type. Since processing in Steps S130 to S136 is the same as that in Operation Pattern 1 of the periodic report type, processing in and after Step S137 will be described. Note that this operation pattern focuses on a QoS-related report.

As shown in FIG. 8, in Step S137, the controller 260 checks whether or not the radio state measured in Step S131 satisfies the radio state threshold on the basis of the radio state information stored in the storage unit 250. The radio state threshold is in advance stored in the storage unit 250, for example. If the radio state satisfies the radio state threshold (Step S137; YES), the processing proceeds to Step S138. If the radio state does not satisfy the radio state threshold (Step S137; NO), the processing proceeds to Step S139.

In Step S138, the controller 260 controls the radio communication unit 210 so that a report can be transmitted to the eNB 100, the report including the radio state information measured and stored in the storage unit 250 in Step S131 and the QoS report information generated and stored in the storage unit 250 in Step S135 or S136. Thereafter, the processing returns to Step S131.

On the other hand, in Step S139, the controller 260 performs switching from the Immediate MDT method to a Logged MDT in a connected state method (hereinafter, referred to as "Logged MDT in Connected")

Since Logged MDT in Connected is configured not to immediately transmit a report but to once store and later report a measurement result, the network can collect a measurement result in a favorable radio environment, and thus has relatively lighter load. The details will be described later. In addition, the UE might be able to transmit the report with lower power. This leads to power reduction. Further, since the connected state is maintained, the measurement of the QoS parameters can be continued.

Still further, like Operation Pattern 2, Step S135 may be omitted. Specifically, if the QCI-required threshold is satisfied, the QoS report information is not reported.

(1.5) Operation Pattern 5 of Periodic Report Type

Figure 9:
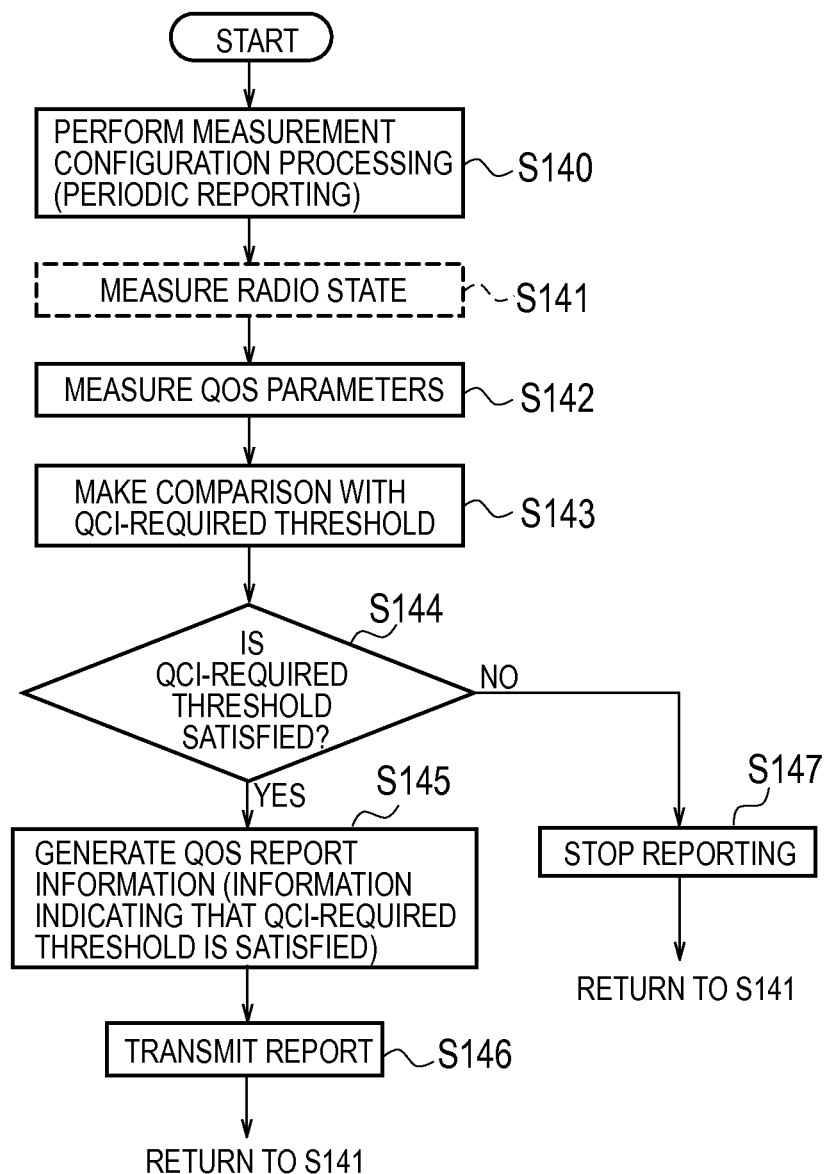
FIG. 9 is an operation flowchart of Operation Pattern 5 of the periodic report type according to the embodiment of the present invention.

FIG. 9 is an operation flowchart of Operation Pattern 5 of the periodic report type. Since processing in Steps S140 to S143 is the same as that in Operation Pattern 1 of the periodic report type, processing in and after Step S144 will be described. Note that measurement of the radio state (Step S141) may be omitted in this operation pattern.

As shown in FIG. 9, in Step S144, the controller 260 checks whether or not the measured QoS parameter satisfies the QCI-required threshold associated with the currently executed application. If the QoS parameter satisfies the QCI-required threshold (Step S144; YES), the processing proceeds to Step S145. If the QoS parameter does not satisfy the QCI-required threshold (Step S144; NO), the processing proceeds to Step S147.

In Step S145, the controller 260 generates QoS report information indicating that the QCI-required threshold is satisfied and stores the QoS report information in the storage unit 250. Thereafter, the processing proceeds to Step S146. In Step S146, the controller 260 controls the radio communication unit 210 so that a report including the QoS report information can be transmitted to the eNB 100. If the radio state is measured in Step S141, the radio state information may be included in the measurement. Thereafter, the processing returns to Step S141.

On the other hand, the controller 260 stops the transmission of the report in Step S146. Thereafter, the processing returns to Step S141.

As described above, if the QCI-required threshold is not satisfied, the radio state might also be deteriorated. Thus, the report can be stopped in this operation pattern. This makes it possible to prevent overhead from increasing due to repetition of retransmission.

(2) Event Trigger Type

Hereinbelow, descriptions are given of Operation Patterns 1 to 4 of the event trigger type.

(2.1) Operation Pattern 1 of Event Trigger Type

Figure 10:
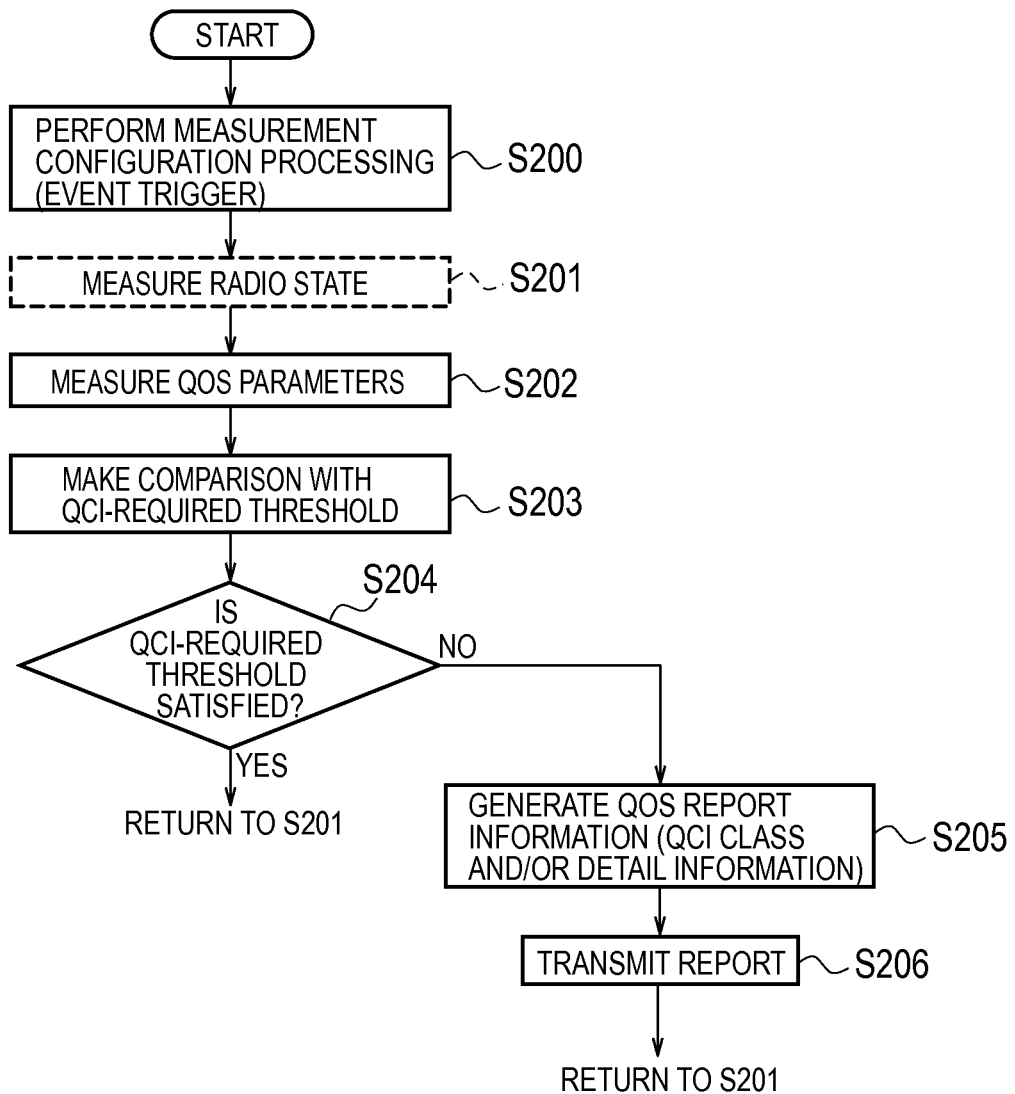
FIG. 10 is an operation flowchart of Operation Pattern 1 of an event trigger type according to the embodiment of the present invention.

FIG. 10 is an operation flowchart of Operation Pattern 1 of the event trigger type.

As shown in FIG. 10, measurement configuration processing is performed in Step S200.

Specifically, after generating measurement configuration information for the UE 200, the controller 140 of the eNB 100 controls the radio communication unit 110 so that the radio communication unit 110 can transmit the measurement configuration information to the UE 200. The measurement configuration information includes information instructing reporting triggered when the QCI-required threshold is not satisfied. Here, the information may include information specifying an application or a bearer to be measured or the QCI class (any of 1 to 9).

The radio communication unit 210 of the UE 200 receives the measurement configuration information. The controller 260 of the UE 200 stores the measurement configuration information received by the radio communication unit 210, in the storage unit 250. The controller 260 starts measurement processing according to the measurement configuration information.

Next, in Step S201, the controller 260 measures the radio state based on a radio signal received by the radio communication unit 210. The controller 260 stores radio state information acquired by measuring the radio state of each of the serving cell and the neighboring cells, in the storage unit 250. Thereafter, the processing proceeds to Step S202.

In Step S202, the controller 260 measures the QoS parameters for the currently executed application. The packet transmission delay and the packet loss rate are herein measured as the QoS parameters. The controller 260 stores the measured QoS parameters in the storage unit 250. Thereafter, the processing proceeds to Step S203.

Note that the processing in Step S202 may be performed between Step S200 and Step S201. In addition, Step S201 may be omitted in this operation pattern.

In Step S203, the controller 260 compares each of the measured QoS parameters with the QCI-required threshold associated with the currently executed application, by using the QCI table stored in the storage unit 250. Thereafter, the processing proceeds to Step S204.

In Step S204, the controller 260 checks whether or not the measured QoS parameter satisfies the QCI-required threshold associated with the currently executed application. If the QoS parameter satisfies the QCI-required threshold (Step S204; YES), the processing returns to Step S201. If the QoS parameter does not satisfy the QCI-required threshold (Step S204; NO), the processing proceeds to Step S205.

In Step S205, the controller 260 generates QoS report information indicating that the QCI-required threshold is not satisfied and stores the QoS report information in the storage unit 250. For example, the controller 260 generates, as the QoS report information, information indicating the QCI class (any one of 1 to 9) which does not satisfy the QCI-required threshold and/or information indicating any of the QoS parameters (the packet transmission delay and the packet loss rate) which does not satisfy the QCI-required threshold, and stores the QoS report information in the storage unit 250. Thereafter, the processing proceeds to Step S206.

In Step S206, the controller 260 controls the radio communication unit 210 so that a report including the QoS report information measured and stored in the storage unit 250 in Step S205 can be transmitted to the eNB 100. If the radio state is measured in Step S201, the report may include the radio state information. Thereafter, the processing returns to Step S201.

As described above, this operation pattern makes it possible to further reduce the overhead in comparison with the operation patterns of the periodic report type.

Note that the example in which the QoS parameters are measured for the one application (service) in this operation pattern has been described for convenience of the explanation, but the QoS parameters may be measured for multiple applications. In this case, the QoS report information may be generated for each application and the multiple pieces of the QoS report information may be transmitted while being included in a single report. The same holds for the following Operation Patterns 2 and 3 of the event trigger type.

In addition, the report transmitted to the eNB 100 includes location information of the UE 200 acquired immediately before the transmission. The same holds for the following Operation Patterns 2 and 3 of the event trigger type.

(2.2) Operation Pattern 2 of Event Trigger Type

Figure 11:
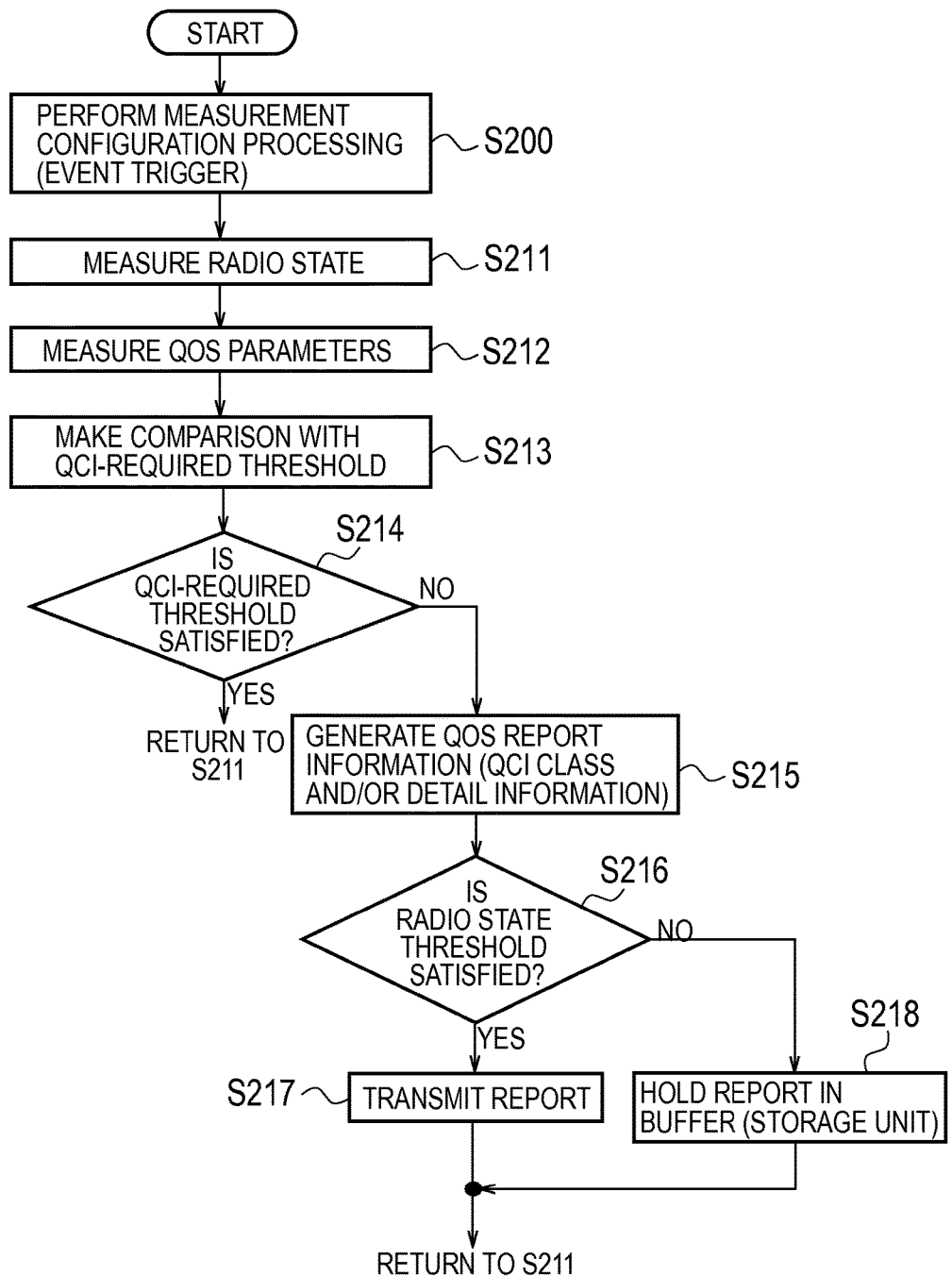
FIG. 11 is an operation flowchart of Operation Pattern 2 of the event trigger type according to the embodiment of the present invention.

FIG. 11 is an operation flowchart of Operation Pattern 2 of the event trigger type. Since processing in Steps S210 to S213 is the same as that in Operation Pattern 1 of the event trigger type, processing in and after Step S214 will be described.

As shown in FIG. 11, in Step S214, the controller 260 checks whether or not the measured QoS parameter satisfies the QCI-required threshold associated with the currently executed application. If the QoS parameter satisfies the QCI-required threshold (Step S214; YES), the processing returns to Step S211. If the QoS parameter does not satisfy the QCI-required threshold (Step S214; NO), the processing proceeds to Step S215.

In Step S215, the controller 260 generates, as QoS report information, information indicating the QCI class (any one of 1 to 9) which does not satisfy the QCI-required threshold and/or information indicating any of the QoS parameters (the packet transmission delay and the packet loss rate) which does not satisfy the QCI-required threshold, and stores the QoS report information in the storage unit 250. Thereafter, the processing proceeds to Step S216.

In Step S216, the controller 260 checks whether or not the radio state measured in Step S211 satisfies the radio state threshold on the basis of the radio state information stored in the storage unit 250. The radio state threshold is in advance stored in the storage unit 250, for example. If the radio state satisfies the radio state threshold (Step S216; YES), the processing proceeds to Step S217. If the radio state does not satisfy the radio state threshold (Step S216; NO), the processing proceeds to Step S218.

In Step S217, the controller 260 controls the radio communication unit 210 so that a report including the QoS report information generated and stored in the storage unit 250 in Step S215 can be transmitted to the eNB 100. The controller 260 may include the radio state information in the report, the radio state information being measured and stored in the storage unit 250 in Step S211. Thereafter, the processing returns to Step S211.

On the other hand, in Step S218, the controller 260 stores the report to be transmitted, in the storage unit 250. Thereafter, the processing returns to Step S211. Note that if the radio state recovers later, the report stored in the storage unit 250 is also transmitted in Step S217 iterated after the processing returns to Step S211, together with a report to be transmitted in Step S217.

As described above, since the overhead is preferably reduced in the state where the radio state is deteriorated, the report is held without being reported. Then, after the radio state recovers, the report can be transmitted.

(2.3) Operation Pattern 3 of Event Trigger Type

Figure 12:
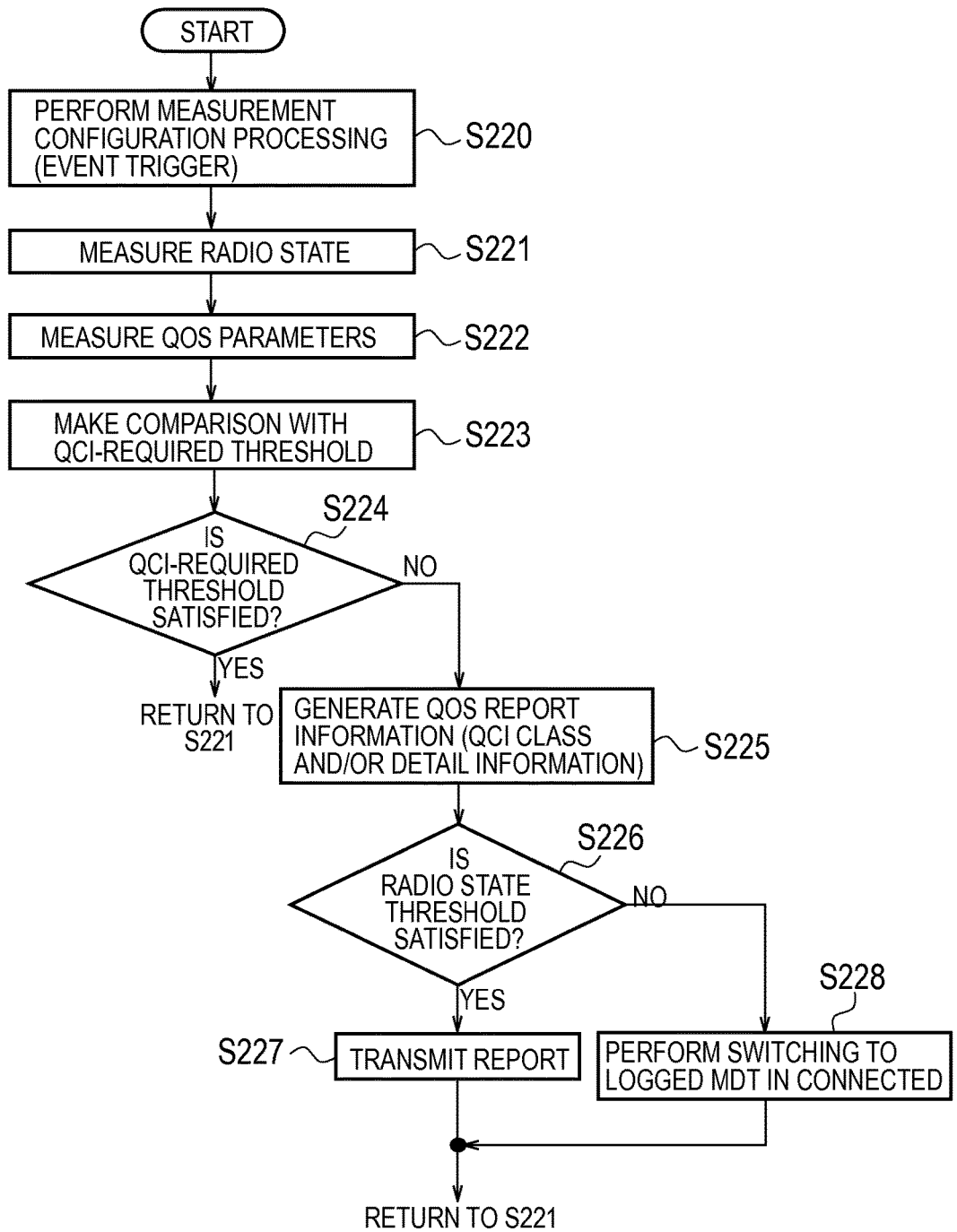
FIG. 12 is an operation flowchart of Operation Pattern 3 of the event trigger type according to the embodiment of the present invention.

FIG. 12 is an operation flowchart of Operation Pattern 3 of the event trigger type. Since processing in Steps S220 to S223 is the same as that in Operation Pattern 1 of the event trigger type, processing in and after Step S224 will be described.

As shown in FIG. 12, in Step S224, the controller 260 checks whether or not the measured QoS parameter satisfies the QCI-required threshold associated with the currently executed application. If the QoS parameter satisfies the QCI-required threshold (Step S224; YES), the processing returns to Step S221. If the QoS parameter does not satisfy the QCI-required threshold (Step S224; NO), the processing proceeds to Step S225.

In Step S225, the controller 260 generates QoS report information indicating that the QCI-required threshold is not satisfied and stores the QoS report information in the storage unit 250. For example, the controller 260 generates, as the QoS report information, information indicating the QCI class (any one of 1 to 9) which does not satisfy the QCI-required threshold and/or information indicating any of the QoS parameters (the packet transmission delay and the packet loss rate) which does not satisfy the QCI-required threshold, and stores the QoS report information in the storage unit 250. Thereafter, the processing proceeds to Step S226.

In Step S226, the controller 260 checks whether or not the radio state measured in Step S221 satisfies the radio state threshold on the basis of the radio state information stored in the storage unit 250. The radio state threshold is in advance stored in the storage unit 250, for example. If the radio state satisfies the radio state threshold (Step S226; YES), the processing proceeds to Step S227. If the radio state does not satisfy the radio state threshold satisfied (Step S226; NO), the processing proceeds to Step S228.

In Step S227, the controller 260 controls the radio communication unit 210 so that a report including the QoS report information generated and stored in the storage unit 250 in Step S225 can be transmitted to the eNB 100. The controller 260 may include the radio state information in the report, the radio state information being measured and stored in the storage unit 250 in Step S221. Thereafter, the processing returns to Step S221.

On the other hand, in Step S228, the controller 260 performs switching from Immediate MDT to Logged MDT in Connected.

Since Logged MDT in Connected is configured not to immediately transmit a report but to once store and later report a measurement result, the network can collect a measurement result in a favorable radio environment, and thus has relatively lighter load. The details will be described later. In addition, the UE might be able to transmit the report with lower power. This leads to power reduction. Further, since the connected state is maintained, the measurement of the QoS parameters can be continued.

Still further, information for Logged MDT in Connected may be included in the measurement configuration information in the measurement configuration processing (Step S220) in this operation pattern. For example, if logging is periodically performed in Logged MDT in Connected, information specifying a logging interval is included in the measurement configuration information. Alternatively, if the logging is performed based on an event trigger in Logged MDT in Connected, information specifying a QoS threshold to cause a trigger is included in the measurement configuration information. In addition, a network absolute time for acquiring time information on the time of logging may be included in the measurement configuration information. Further, information specifying duration for holding measurement data may be included in the measurement configuration information. The same holds for the following Operation Pattern 4 of the event trigger type.

(2.4) Operation Pattern 4 of Event Trigger Type

Figure 13:
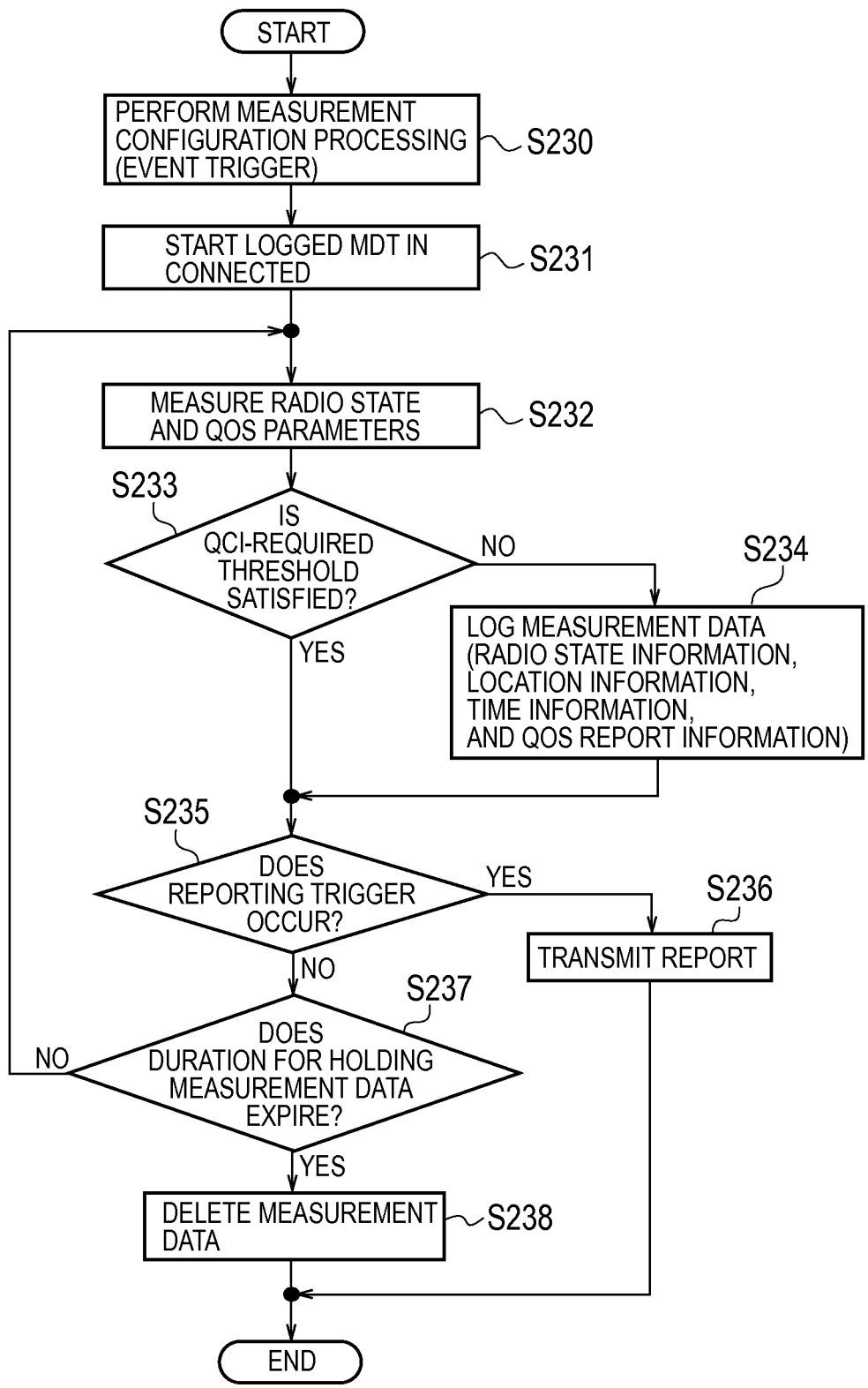
FIG. 13 is an operation flowchart of Operation Pattern 4 of the event trigger type according to the embodiment of the present invention.

FIG. 13 is an operation flowchart of Operation Pattern 4 of the event trigger type. Since processing in Step S230 is the same as that in Operation Pattern 1 of the event trigger type, processing in and after Step S231 will be described.

As shown in FIG. 13, the controller 260 starts Logged MDT in Connected in Step S231. Thereafter, the processing proceeds to Step S232.

In Step S232, the controller 260 measures the radio state and each QoS parameter. Thereafter, the processing proceeds to Step S233.

In Step S233, the controller 260 checks whether or not the measured QoS parameter satisfies the QCI-required threshold associated with the currently executed application. If the QoS parameter satisfies the QCI-required threshold (Step S233; YES), the processing proceeds to Step S235. If the QoS parameter does not satisfy the QCI-required threshold (Step S233; NO), the processing proceeds to Step S234.

In Step S234, the controller 260 generates QoS report information indicating that the QCI-required threshold is not satisfied and stores the QoS report information in the storage unit 250. For example, the controller 260 generates, as the QoS report information, information indicating the QCI class (any one of 1 to 9) which does not satisfy the QCI-required threshold and/or information indicating any of the QoS parameters (the packet transmission delay and the packet loss rate) which does not satisfy the QCI-required threshold. In addition, the controller 260 generates time information constituted of the network absolute time included in the measurement configuration information and an elapsed time (a relative time). Then, the controller 260 logs measurement data including radio state information, location information, the time information, and the QoS report information, in the storage unit 250. Thereafter, the processing proceeds to Step S235.

In Step S235, the controller 260 checks whether or not a reporting trigger occurs. The reporting trigger may be the same as that in general Logged MDT. If the reporting trigger occurs (Step S235; YES), the processing proceeds to Step S236. If the reporting trigger does not occur (Step S235; NO), the processing proceeds to Step S237.

In Step S236, the controller 260 controls the radio communication unit 210 so that a report including all the measurement data held in the storage unit 250 can be transmitted to the network. Thereby, the Logged MDT in Connected processing is terminated.

On the other hand, in Step S237, the controller 260 checks whether or not the duration for holding the measurement data expires. If the duration for holding the measurement data expires (Step S237; YES), the processing proceeds to Step S238. If the duration for holding the measurement data does not expire (Step S237; NO), the processing returns to Step S232.

In Step S238, the controller 260 deletes all the measurement data held in the storage unit 250. Also in this case, the Logged MDT in Connected processing is terminated.

As described above, in the case where the processing is triggered when the QCI-required threshold is not satisfied, there is a possibility that the radio state is also deteriorated at the trigger timing and thus the reporting is difficult. Accordingly, in the case where the processing is triggered when the QCI-required threshold is not satisfied, Logged MDT in Connected is applied instead of Immediate MDT, and thereby the reporting can be performed more reliably.

SUMMARY OF EMBODIMENT

As described above, this embodiment enables the network to collect the QoS report information related to the QoS parameters measured by the UE 200 in the MDT, and thus can contribute to the capacity optimization of the mobile communication system 1. For example, it is possible to identify a low capacity zone having a low capacity despite in a favorable radio state.

Other Embodiment

As described above, the details of the present invention have been described by using the embodiment. However, it should be understood that the description and drawings which constitute part of this disclosure do not limit the present invention. From this disclosure, various alternative embodiments, examples, and operation techniques will be easily found by those skilled in the art.

For example, in the aforementioned embodiment, the description has been given by taking the example of the mobile communication system configured based on LTE. However, the present invention is not limited to LTE and may be applied to another mobile communication system (W-CDMA, for example) supporting the MDT.

In the aforementioned embodiment, the description has been given by taking the example in which the UE 200 measures QoS parameter in Immediate MDT. However, the UE 200 does not measure QoS parameter, but eNB 100 may measure QoS parameter.

In addition, the QoS measurement is performed for the QoS parameters (the packet transmission delay and the packet loss rate) related to the QCI. However, the QoS measurement may be performed for another QoS parameter (such as a jitter).

In the aforementioned embodiment, description has been given by taking the example in which QoS parameters are parameters measurable on an application level. However, it is not limited to the application level, but QoS parameters may be parameters measurable on a layer higher than physical layer (layer 1). For example, QoS parameters may be parameters measurable on layer 2.

As described above, it should be understood that the present invention includes various embodiments which are not described herein and the like.

It is to be noted that the entire contents of U.S. Provisional Application No. 61/541,718 (filed on Sep. 30, 2011) are incorporated herein by reference.

INDUSTRIAL APPLICABILITY

As described above, the mobile communication method, the user terminal, and the processor according to the present invention can contribute to capacity optimization of a mobile communication system. Accordingly, the present invention is useful in radio communication such as mobile communication.

The invention claimed is:

1. A mobile communication method used in a user terminal connected to a base station, comprising:
    receiving a Minimization of Drive Test (MDT) configuration message from the base station, the MDT configuration message including an interval for periodically reporting an MDT report to the base station based on a packet delay measurement and including a predetermined packet delay threshold for determining whether to report the MDT report;
    measuring a packet delay in communication between the user terminal and the base station, wherein the packet delay is measured for each of a plurality of quality of service class identifiers (QCIs);

comparing the measured packet delay with the predetermined packet delay threshold; and transmitting the MDT report to the base station in response to the end of the interval, in case that measured packet delay of a QCI of the plurality of QCIs exceeds the predetermined packet delay threshold, wherein the MDT report includes a combination of:
  information including the QCI of the plurality of QCIs, for which the measured packet delay exceeds the predetermined packet delay threshold, and not including the QCI of the plurality of QCIs for which the measured packet delay does not exceed the predetermined packet delay threshold; and
  for each QCI of the plurality of QCIs, for which the measured packet delay exceeds the predetermined packet delay threshold, a measurement result based on the measured packet delay of the QCI.

2. A user terminal connected to a base station, the user terminal comprising:
  a processor and a memory coupled to the processor, the processor configured to perform processes of:
  receiving a Minimization of Drive Test (MDT) configuration message from the base station, the MDT configuration message including an interval for periodically reporting an MDT report to the base station based on a packet delay measurement and including a predetermined packet delay threshold for determining whether to report the MDT report;
  measuring a packet delay in communication between the user terminal and the base station, wherein the packet delay is measured for each of a plurality of quality of service class identifiers (QCIs);
  comparing the measured packet delay with the predetermined packet delay threshold; and
  transmitting the MDT report to the base station in response to the end of the interval, in case that measured packet delay of a QCI of the plurality of QCIs exceeds the predetermined packet delay threshold, wherein
  the MDT report includes a combination of:
    information including the QCI of the plurality of QCIs, for which the measured packet delay exceeds the predetermined packet delay threshold, and not including the QCI of the plurality of QCIs for which the measured packet delay does not exceed the predetermined packet delay threshold; and
    for each QCI of the plurality of QCIs, for which the measured packet delay exceeds the predetermined packet delay threshold, a measurement result based on the measured packet delay of the QCI.

3. An apparatus to be provided in a user terminal connected to a base station, the apparatus comprising:
  a processor and a memory coupled to the processor, the processor configured to perform processes of:
  receiving a Minimization of Drive Test (MDT) configuration message from the base station, the MDT configuration message including an interval for periodically reporting an MDT report to the base station based on a packet delay measurement and including a predetermined packet delay threshold for determining whether to report the MDT report;
  measuring a packet delay in communication between the user terminal and the base station, wherein the packet delay is measured for each of a plurality of quality of service class identifiers (QCIs);
  comparing the measured packet delay with the predetermined packet delay threshold; and
  transmitting the MDT report to the base station in response to the end of the interval, in case that measured packet delay of a QCI of the plurality of QCIs exceeds the predetermined packet delay threshold, wherein
  the MDT report includes a combination of:
    information including the QCI of the plurality of QCIs, for which the measured packet delay exceeds the predetermined packet delay threshold, and not including the QCI of the plurality of QCIs for which the measured packet delay does not exceed the predetermined packet delay threshold; and
    for each QCI of the plurality of QCIs, for which the measured packet delay exceeds the predetermined packet delay threshold, a measurement result based on the measured packet delay of the QCI.

* * * * *